US012681461B2

(12) United States Patent
Oonishi

(10) Patent No.: US 12,681,461 B2
(45) Date of Patent: Jul. 14, 2026

(54) NUMERICAL CONTROL DEVICE

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 371 days.

(21) Appl. No.: 18/554,929

(22) PCT Filed: Jun. 10, 2021

(86) PCT No.: PCT/JP2021/022140
§ 371 (c)(1),
(2) Date: Oct. 11, 2023

(87) PCT Pub. No.: WO2022/259469
PCT Pub. Date: Dec. 15, 2022

(65) Prior Publication Data
US 2024/0201663 A1     Jun. 20, 2024

(51) Int. Cl.
*G05B 19/416* (2006.01)
(52) U.S. Cl.
CPC .. *G05B 19/416* (2013.01); *G05B 2219/43052* (2013.01)
(58) Field of Classification Search
None
See application file for complete search history.

(56) References Cited

U.S. PATENT DOCUMENTS 4,163,184 A     7/1979  Leenhouts
11,507,061 B2*  11/2022 Pitz .................... G05B 19/4166

FOREIGN PATENT DOCUMENTS

| JP | H05-127731 A | 5/1993 |
| JP | 2000-020118 A | 1/2000 |
| JP | 2004-030540 A | 1/2004 |
| JP | 2008-225825 A | 9/2008 |
| JP | 6795553 B2 | 12/2020 |
| JP | 2021-002092 A | 1/2021 |

OTHER PUBLICATIONS

International Search Report issued in PCT/JP2021/022140; mailed Aug. 31, 2021.

* cited by examiner

*Primary Examiner* — Ryan A Jarrett
(74) *Attorney, Agent, or Firm* — Studebaker Brackett PLLC

(57) ABSTRACT

This numerical control device, capable of easily suppressing an increase in processing time, controls the drive axis of a machine tool on the basis of a processing program including a plurality of movement blocks each specifying a command speed, and comprises a target speed setting unit that sets a target speed obtained by, with respect to two movement blocks to be executed continuously, modifying the command speed of the movement block with a lower command speed in a region adjacent to the other movement block to a value equal to or higher than the lower command speed but equal to or lower than the higher command speed.

4 Claims, 3 Drawing Sheets

NUMERICAL CONTROL DEVICE

TECHNICAL FIELD

The present invention relates to a numerical control device.

BACKGROUND ART

In numerical control devices that control the drive axes of machine tools based on a machining program that specifies a speed for each block, control of the drive axes as specified by the machining program may result in driving the machine tool at excessive acceleration, causing vibrations in the machine tool and the risk of overloading. Therefore, widely used numerical control devices have the function to set a restriction on the acceleration/deceleration (change rate of the speed) of the drive axes and allow the machining program to change the speed by reducing the acceleration.

Restricting the acceleration/deceleration in numerical control devices as described above extends the machining time (cycle time). Therefore, a proposed technique analyzes a machining program, generates a parametric curve that defines the relationship between the travel distance and the command speed, whereby suppressing the increase in the machining time caused by the control of restricting the acceleration/deceleration (see, for example, Patent Document 1).

Patent Document 1: Japanese Patent No. 6795553

DISCLOSURE OF THE INVENTION

Problems to be Solved by the Invention

As disclosed in Patent Document 1, special processing is required to analyze a machining program and reconstruct the change in command speed, complicating the design and increasing the computational load. Users are required to have new knowledge and experience to adjust parameters such as how much the acceleration/deceleration should be restricted. Therefore, a technique that can easily suppress the increase in machining time has been desired.

Means for Solving the Problems

A numerical control device according to one aspect of the present disclosure is a numerical control device that controls a drive axis of a machine tool, based on a machining program that includes a plurality of movement blocks each specifying a command speed, in which the device includes a target speed setting unit that sets a target speed acquired by, with respect to two of the movement blocks to be executed consecutively, modifying the command speed of a movement block with a lower command speed in a region adjacent to the other movement block to a value equal to or higher than the lower command speed but equal to or lower than the higher command speed.

Effects of the Invention

With the numerical control device according to the present disclosure, the increase in machining time can be easily suppressed.

PREFERRED MODE FOR CARRYING OUT THE INVENTION

Figure 1:
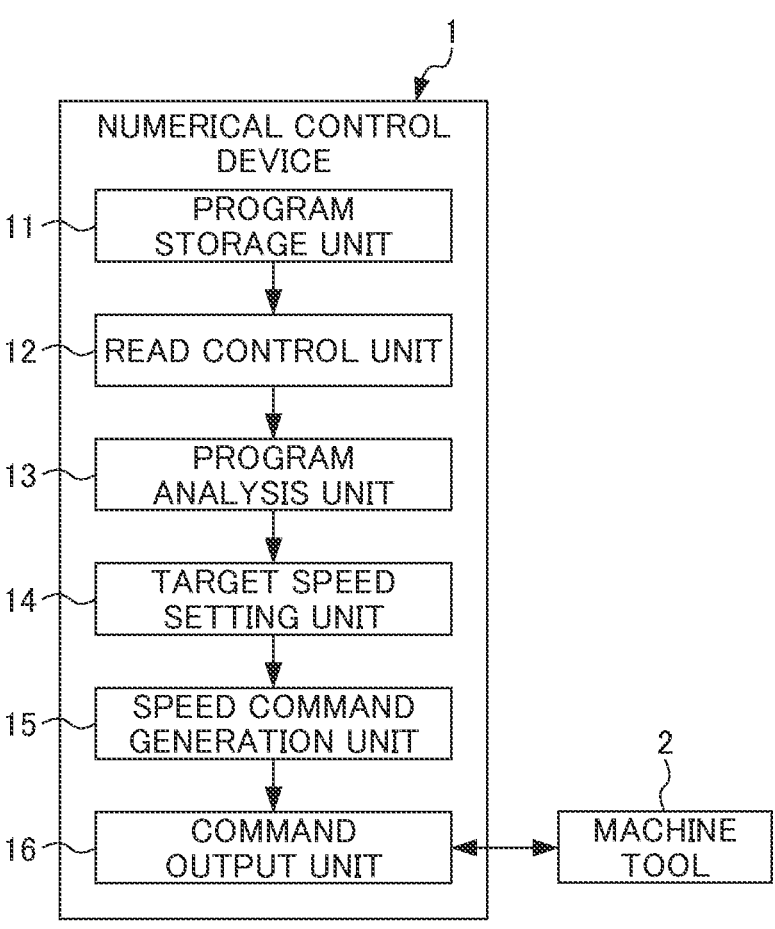
FIG. 1 is a block diagram illustrating a configuration of a numerical control device according to a first embodiment of the present disclosure.

Embodiments of the present disclosure will be described below with reference to the drawings. FIG. 1 is a block diagram illustrating a configuration of a numerical control device 1 according to the first embodiment of the present disclosure.

The numerical control device 1 controls the drive axis of a machine tool 2, based on a machining program. The machine tool 2 that is controlled by the numerical control device 1 includes a plurality of drive axes that move or rotate tools or workpieces. In this specification, the drive axis is not limited to a drive axis that moves tools and workpieces relative to each other to determine the shape after machining, and may include the main axis that rotates tools or workpieces to perform cutting, and the drive axis that operates other auxiliary equipment.

The numerical control device 1 includes a program storage unit 11, a read control unit 12, a program analysis unit 13, a target speed setting unit 14, a speed command generation unit 15, and a command output unit 16. The numerical control device 1 may be implemented by executing an appropriate control program on a computer device having a memory, a processor (CPU), and an input/output interface. Specifically, the numerical control device 1 is implemented by a numerical control program that causes the processor to execute a plurality of processing units to perform the respective functions of the program storage unit 11, the read control unit 12, the program analysis unit 13, the target speed setting unit 14, the speed command generation unit 15, and the command output unit 16. Such a numerical control program may be provided in a state stored in a non-temporary storage medium. The above components of the numerical control device 1 are classified based on the functions of the numerical control device 1, and do not necessarily have to be clearly segmented in terms of the physical configuration and program configuration.

The program storage unit 11 stores a machining program. The machining program, for example, is described in a predetermined language such as G code, and may be configured with a plurality of command blocks that each specify a unit motion or processing of the machine tool 2. The command blocks include movement blocks that specify the command speed, which is the relative speed of the tool and workpiece, and the target coordinate position.

The command speed specified in the machining program may be set without considering the mechanism constraints on the machine tool 2; therefore, the command speed specified by two movement blocks to be executed temporally consecutively may change in a discontinuous manner. Therefore, if the drive axis of the machine tool 2 is changed in a speed faithful to the machining program, vibrations may occur in the machine tool 2, involving a risk of overloading.

When controlling the machine tool 2 in accordance with the machining program, the read control unit 12 pre-reads the command blocks of the machining program from the program storage unit 11 earlier than actually driving the drive axis.

The program analysis unit 13 analyzes the contents of the pre-read command blocks, and shows a motion in accordance with the movement block included in the machining program, as a command speed for each time. Depending on the configuration of the speed command generation unit 15, the command speed may be the composite speed of a plurality of drive axes (for example, the absolute value of the relative speed of the tool and workpiece), or may be the speed of each drive axis.

The target speed setting unit 14 sets a target speed that is a command speed derived from the machining program and partially modified by the program analysis unit 13. Specifically, the target speed setting unit 14 sets a target speed acquired by, with respect to the two movement blocks to be executed temporally consecutively, modifying the command speed of a movement block with a lower command speed in a region adjacent to the other movement block to a value equal to or higher than the lower command speed but equal to or lower than the higher command speed. In other words, outside the adjacent region, the target speed set by the target speed setting unit 14 is the same speed as the command speed. In the adjacent region, if the command speed of the movement block is smaller than the command speed of the consecutive movement block, the target speed is equal to or higher than the command speed of the movement block and equal to or lower than the command speed of the consecutive movement block. If the command speed of the movement block is equal to or lower than the command speed of the consecutive movement block, the target speed is equal to the command speed of the movement block.

By setting such a target speed, it is possible to suppress the increase in machining time due to the processing of restricting the acceleration/deceleration speed in the speed command generation unit 15, while performing a motion that can be considered almost equivalent to the target speed specified in the machining program in the actual motion of the drive axis.

The target speed setting unit 14 may set the distance width or time width of the adjacent region, for which a target speed different from the command speed specified in the machining program is set, as a preset width. In other words, the time width of the adjacent region may be a preset fixed width, or the time when the driving distance becomes a certain preset distance, that is, the time when the integral value of the target speed becomes a certain value. This can suppress the increase in processing time while relatively suppressing the calculation load.

The target speed setting unit 14 may vary the distance width or time width of the adjacent region according to the difference in command speed of two movement blocks to be executed consecutively. As an example, the target speed setting unit 14 may determine the distance width or time width of the adjacent region according to the difference in command speed of two movement blocks to be executed consecutively and the speed control constraints, described later, set in the speed command generation unit 15. This allows for optimization of the width of the adjacent region, whereby reducing the difference from the command speed of the speed command value while suppressing the increase in processing time. More specifically, the time width of the adjacent region can be set to {0.5×(difference in command speed between two movement blocks)/(upper limit of acceleration/deceleration speed)}. This allows the speed command value at the boundary between the movement blocks to be substantially the average speed of the command speeds of the two movement blocks (average speed of the two command speeds without considering time), minimizing the difference from the command speed of the speed command value. In order to more accurately match the speed command value at the boundary between the movement blocks to the average speed of the command speeds of the two movement blocks, the target speed setting unit 14 may determine the width of the adjacent region by further considering jerk restrictions, etc. in the speed command generation unit 15.

In the target speed setting unit 14, if the target speed in the adjacent region with the lower command speed is equal to the average speed of the command speeds of the two consecutive movement blocks, then as long as the width of the adjacent region is sufficient, the integral value of the difference between the speed command value and the command speed due to the upper limit of acceleration in the movement block of the higher command speed can be made approximately half the integral value of the difference necessary overall; therefore, the difference due to acceleration restrictions can be substantially evenly distributed between the two movement blocks.

The target speed setting unit 14 may set the target speed in the adjacent region with the lower command speed equal to the higher command speed. This can prevent the processing time from extending by having the speed command value hit a ceiling once between the two command speeds. However, in this case, it is important to appropriately set the width of the adjacent region to minimize the difference from the command speed of the speed command value.

The target speed setting unit 14 may be configured to stop its function at the user's choice and input the command speed derived by the program analysis unit 13 directly into the speed command generation unit 15. By stopping the function of the target speed setting unit 14, the numerical control device 1 of the present embodiment can perform the same control as the conventional numerical control device.

The speed command generation unit 15 generates a speed command value such that the speed (composite speed) of the drive axis of the machine tool 2 does not exceed the target speed set by the target speed setting unit 14 and adheres to the speed control constraints on at least one of the N-th order derivative elements of the speed of each drive axis or the N-th order derivative elements of the composite speed of a plurality of drive axes (N is any natural number, i.e., a non-negative integer). In other words, "speed control constraints" mean that at least one of the speed of each drive axis or the N-th derivative values of the composite speed in the case of following the speed command value does not exceed a set upper limit.

Specifically, the speed command generation unit 15 may be configured to generate a speed command value such that the individual acceleration/deceleration (the first derivative of the speed) of each drive axis or the acceleration/deceleration of a composite motion implemented by a plurality of drive axes does not exceed a preset upper limit of acceleration/deceleration. The speed command generation unit 15 may generate a command value such that the jerk (the second derivative of the speed) of the drive axis of the machine tool 2 does not exceed a preset upper limit of jerk. In other words, the target speed set by the target speed setting unit 14 is a target value when the speed command generation unit 15 sets the speed command value and is also one of the constraint conditions that sets the upper limit of the speed according to the intended machining. The speed control constraints are mainly constraints that are set based on the specifications of the machine tool. The processing of generating a speed command value under such constraint conditions is the same as the processing of generating a speed command value, based on a command speed in a conventional numerical control device.

The command output unit 16 adjusts the driving current of each drive axis such that each drive axis of the machine tool 2 operates in accordance with the speed command value generated by the speed command generation unit 15, that is, such that the speed of the drive axis at each moment matches the speed of the speed command value.

Figure 2:
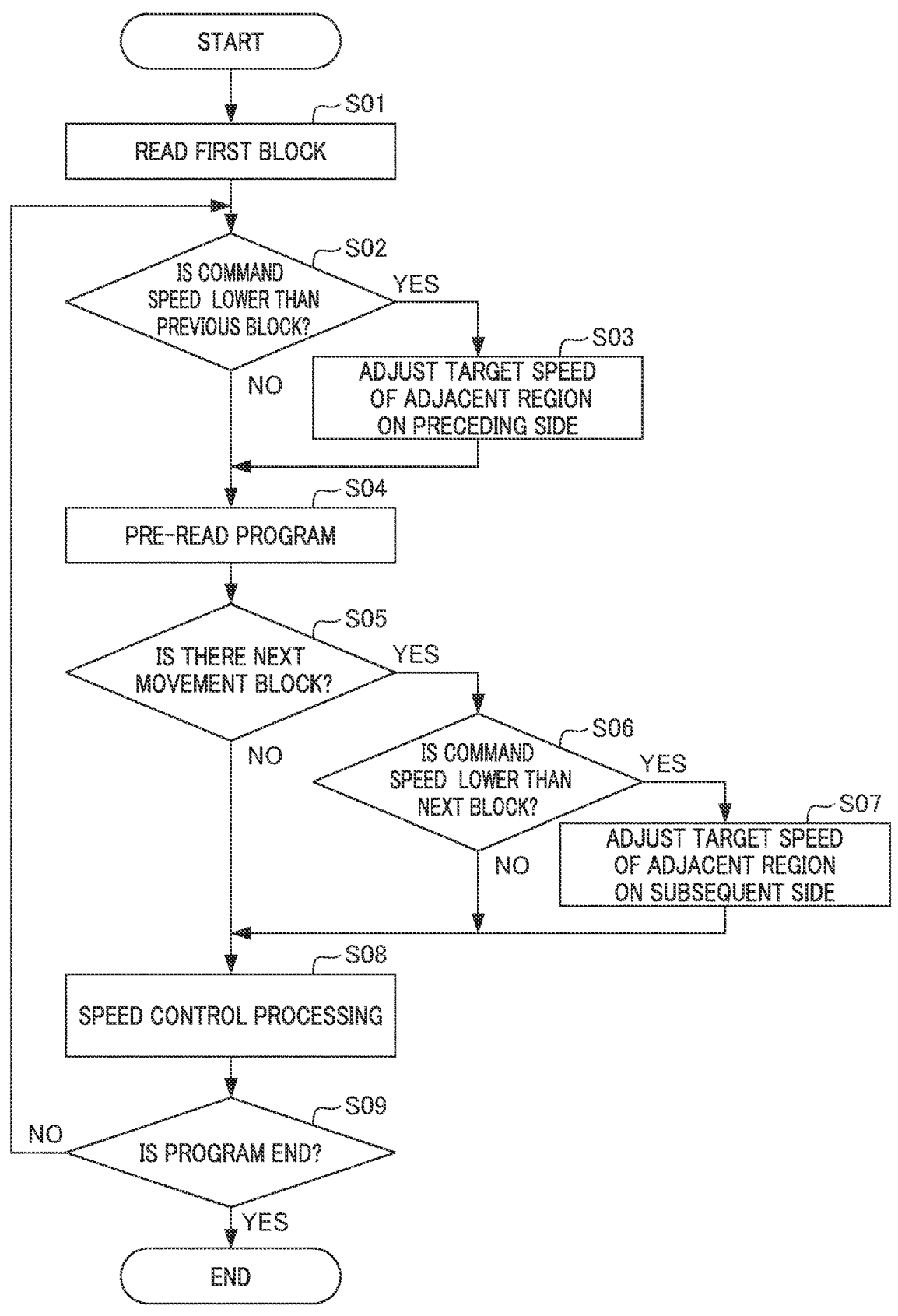
FIG. 2 is a flowchart illustrating a control procedure in the numerical control device of FIG. 1.

The control procedure of the numerical control device 1 having the above configuration is illustrated in the flowchart of FIG. 2. The control by the numerical control device 1 includes the steps of: reading the first movement block to be processed (Step S01); comparing the command speed of the movement block to be processed with the command speed of the immediately preceding movement block (Step S02); adjusting the target speed of the adjacent region on the preceding side (Step S03); pre-reading the machining program (Step S04); checking the presence of absence of the next movement block (Step S05); comparing the command speed of the movement block to be processed with the command speed of the immediately subsequent movement block (Step S06); adjusting the target speed of the adjacent region on the subsequent side (Step S07); performing speed control based on the target speed of the movement block to be processed (Step S08); and checking the end of the machining program (Step S09).

This flowchart may be interpreted as sequential processing in real-time from the processing by the read control unit 12 to the processing by the command output unit 16 in accordance with the motion of the machine tool 2; however, the reading of the command block in Steps S01 and S04 can be interpreted as the step where the target speed setting unit 14 acquires the command speed data from the program analysis unit 13, and the speed control processing in Step S08 can be interpreted as the processing where the target speed setting unit 14 passes the target speed data to the speed command generation unit 15. In other words, the motion of each component of the numerical control device 1 may be temporally separated by providing a data buffer for each component as necessary.

Figure 3:
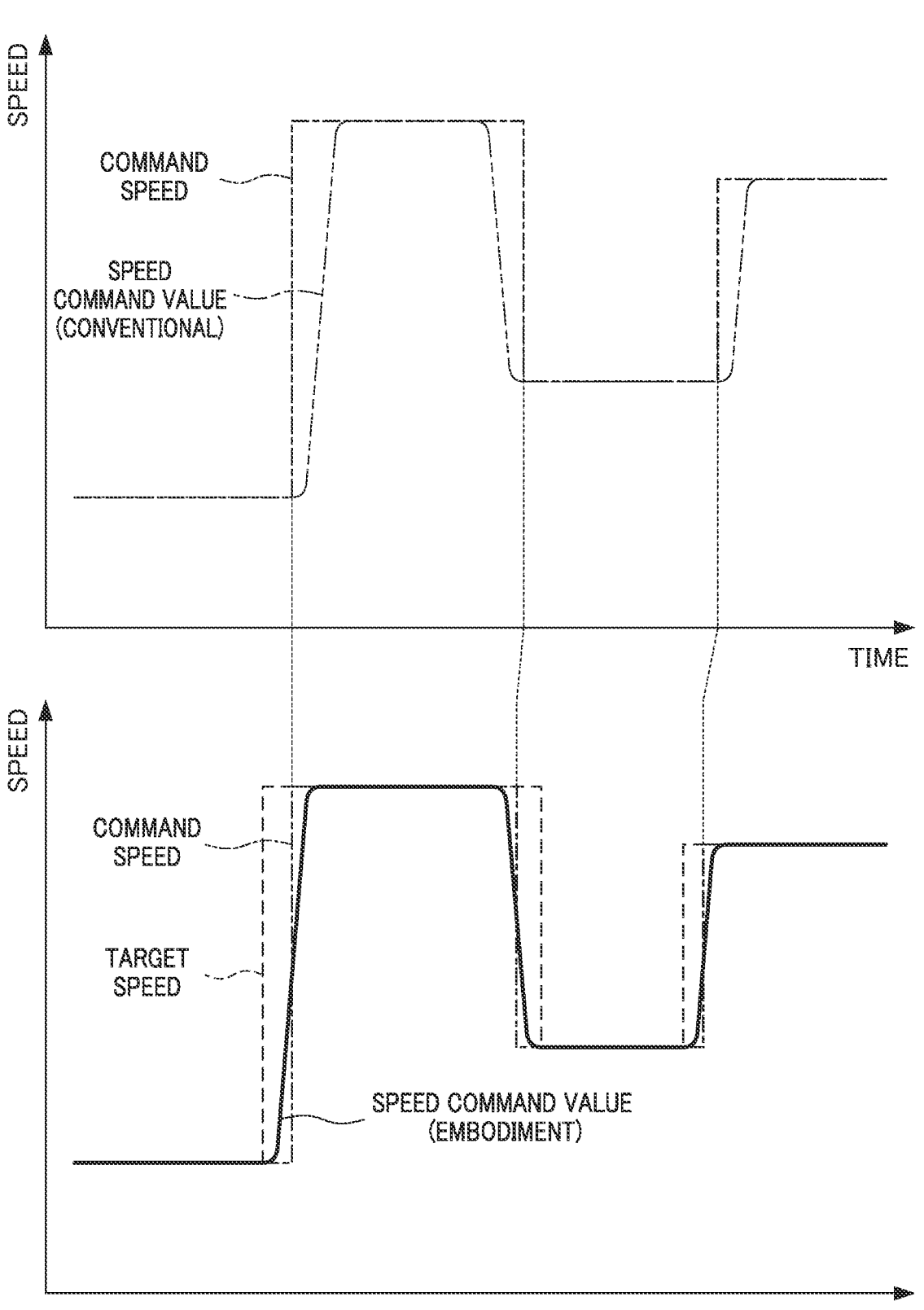
FIG. 3 is a graph illustrating a relationship between the command speed, the target speed, and the speed command value in the numerical control device of FIG. 1.

FIG. 3 is a graph illustrating the temporal change in the command speed, the target speed, and the speed command value in the numerical control device 1. In this graph, the command speed following the machining program is indicated with a dashed line, the target speed set by the target speed setting unit 14 is indicated with a broken line, the speed command value generated by the speed command generation unit 15 based on the target speed (speed command value according to the present embodiment) is indicated with a solid line, and the speed command value generated by the speed command generation unit 15 based on the command speed (conventional speed command value) is indicated with a double dashed line. Note that the target speed in the adjacent region of the movement block of a low command speed is set equal to the higher command speed. The graph of FIG. 3 is intended to emphasize the differences in waveforms of the speed change, and does not accurately represent the actual speed command values.

As described above, the numerical control device 1 includes the target speed setting unit 14 that employs a numerical control method including the step of setting a target speed acquired by, with respect to two movement blocks to be executed consecutively, modifying the command speed of a movement block with a lower command speed in a region adjacent to the other movement block to a value equal to or higher than the lower command speed but equal to or lower than the higher command speed; therefore, even if vibrations and overloads are suppressed by preventing acceleration/deceleration exceeding the upper limit in the speed command generation unit 15, the speed command value changes similarly to the change in the command speed, allowing for suppressing the increase in machining time.

In conventional numerical control devices, since the command speed is used directly as the target speed, due to the processing of restricting acceleration/deceleration, the actual speed change shows a waveform different from the speed change expected by the user who created the machining program, resulting in longer machining time than expected, and significant deviation from the command speed. In contrast, the numerical control device 1 of the present embodiment sets a target speed acquired by modifying the command speed; therefore, a speed change close to the speed change expected by the user can be achieved, and the increase in machining time can be suppressed.

Even in conventional numerical control devices, by describing the movement block divided into a plurality of parts, a speed change substantially equivalent to that of the numerical control device 1 can be achieved; however, it is difficult to accurately determine the division width, etc., and it is not easy to create an appropriate machining program. In contrast, in the numerical control device 1, since the target speed setting unit 14 automatically sets an appropriate target speed, appropriate machining can be performed in a relatively short cycle time.

The numerical control device 1 has a configuration corresponding to the conventional numerical control device with simple addition of the target speed setting unit 14, which performs relatively simple calculations; therefore, the increase in computational load can be suppressed as compared to the conventional numerical control, while suppressing the increase in machining time.

The numerical control device 1, except for the target speed setting unit 14 setting a slightly modified command speed as a target speed, performs the same processing as the conventional numerical control; therefore, the users familiar with the conventional numerical control device can relatively easily expect the changes in the speed command value caused by adjusting the parameters, so the machining can be easily optimized.

The embodiments of the present disclosure have been described above; however, the present invention is not limited to the aforementioned embodiments. The effects described in the aforementioned embodiments merely list the most preferable effects arising from the present invention, and the effects according to the present invention are not limited to those described in the aforementioned embodiments.

EXPLANATION OF REFERENCE NUMERALS

1: numerical control device
11: program storage unit
12: read control unit
13: program analysis unit
14: target speed setting unit
15: speed command generation unit
16: command output unit
2: machine tool

The invention claimed is:
1. A numerical control device that controls a drive axis of a machine tool, based on a machining program that includes a plurality of movement blocks each specifying a command speed, the device comprising a processor, the processor being configured to:

set a target speed acquired by, with respect to two of the movement blocks to be executed consecutively, modifying the command speed of a movement block with a lower command speed in a region adjacent to the other movement block to a value equal to or higher than the lower command speed but equal to or lower than a higher command speed; and generate a command value such that a speed of the drive axis does not exceed the target speed and adheres to a speed control constraint on at least one of N-th derivative elements of the speed of the drive axis or N-th derivative elements of a composite speed of a plurality of drive axes (where N is any natural number).

2. The numerical control device according to claim 1, wherein the processor is further configured to change a distance width or a time width of the adjacent region, based on a difference in the command speed of the two movement blocks to be executed consecutively.

3. The numerical control device according to claim 2, wherein the processor is further configured to set the distance width or the time width of the adjacent region, based on a difference in the command speed of the two movement blocks to be executed consecutively and the speed control constraint.

4. The numerical control device according to claim 1, wherein the processor is further configured to set the distance width or the time width of the adjacent region to a preset width.

* * * * *